United States Patent [19]

Taylor

[11] Patent Number: 5,133,435
[45] Date of Patent: Jul. 28, 1992

[54] ADJUSTABLE DRY FRICTION SHOCK ABSORBER

[75] Inventor: Paul H. Taylor, Grand Island, N.Y.

[73] Assignee: Tayco Developments, Inc., North Tonawanda, N.Y.

[21] Appl. No.: 453,630

[22] Filed: Dec. 20, 1989

[51] Int. Cl.[5] ............................................. F16F 7/08
[52] U.S. Cl. ..................................... 188/381; 188/280; 188/281; 188/129; 267/134
[58] Field of Search ............... 188/129, 271, 281, 284, 188/280, 136, 381; 267/134

[56] References Cited

U.S. PATENT DOCUMENTS

| | | | |
|---|---|---|---|
| 1,169,538 | 1/1916 | Heber | 16/66 |
| 1,675,980 | 7/1928 | Lebherz | 16/66 |
| 1,916,571 | 7/1933 | Hoffman | 16/66 |
| 2,139,666 | 12/1938 | Bogart | 188/129 X |
| 2,426,661 | 9/1947 | Anderson | 267/134 |
| 2,812,533 | 11/1957 | Falk | 16/66 |
| 3,059,916 | 10/1962 | Fahlbusch et al. | 267/64.26 |
| 3,131,420 | 5/1964 | Quinn | 16/66 |
| 3,249,961 | 5/1966 | Quinn | 16/66 |
| 3,713,516 | 1/1973 | Freyler | 188/129 |
| 3,866,724 | 2/1975 | Hollnagel | 188/381 X |
| 4,318,535 | 3/1982 | Imai | 267/226 |
| 4,583,621 | 4/1986 | Tangorra | 188/281 X |
| 4,729,458 | 3/1988 | Bauer et al. | 188/129 |
| 4,877,226 | 10/1989 | Taylor | 267/196 |
| 4,955,467 | 9/1990 | Kallenbach | 188/381 |

FOREIGN PATENT DOCUMENTS

| | | | |
|---|---|---|---|
| 598485 | 7/1932 | Fed. Rep. of Germany | 188/129 |
| 1101872 | 10/1955 | France | 188/129 |
| 482765 | 7/1953 | Italy | 188/129 |
| 521252 | 5/1940 | United Kingdom | 188/271 |

Primary Examiner—Douglas C. Butler
Assistant Examiner—Alfred Muratori
Attorney, Agent, or Firm—Joseph P. Gastel

[57] ABSTRACT

A dry friction shock absorber including a casing having an internal surface, a piston of low coefficient of friction bearing material having an external surface in contiguous relationship with the internal surface of the casing, attachment fittings on the piston and the casing for moving the piston into the casing when the shock absorber is subjected to shock forces, and expanding structure within the piston for tending to move the external surface of the piston outwardly toward the internal surface of the casing to increase the friction therebetween when the shock absorbing force is applied to the shock absorber for moving the piston into the casing. Adjustment structure is provided for varying the expanding force on the piston. A shock absorber of the foregoing type wherein the expanding structure is not activated when the piston moves slowly relative to the casing but which produces an expanding force on the piston when the shock absorber is subjected to shock forces both in tension and compression.

23 Claims, 5 Drawing Sheets

ADJUSTABLE DRY FRICTION SHOCK ABSORBER

BACKGROUND OF THE INVENTION

The present invention relates to an adjustable dry friction type of shock absorber which utilizes a piston of a material having a low coefficient of friction, and a small molecular wear particle size.

By way of background, many facilities require a non-fluid shock absorber because fluid leakage cannot be tolerated. In the past, many dry shock absorbers utilized elements of asbestos and other like materials. These elements shedded particles which were contaminants to their environments. By way of further background, the clearance between sliding parts is proportional to the wear particle size, which is defined as the size of the particles which are shed during frictional engagement between sliding objects. When one of the sliding parts has a small wear particle size, there can be small clearances between the sliding parts which in turn results in rapid shock absorbing responses. Furthermore, where one of the sliding elements has a small wear particle size and has a low coefficient of friction, misalignment or side loading of a piston of a shock absorber will not result in significant friction, while still retaining the tight clearances which are desired.

SUMMARY OF THE INVENTION

One important object of the present invention is to provide an improved dry friction shock absorber utilizing a low coefficient of friction piston which produces a very small wear particle size and thus can be used in environments wherein contamination cannot be tolerated. A related object of the present invention is to provide a dry friction shock absorber of the foreging type which can possess very small clearances between the piston and its associated cylinder so that the clearances themselves do not add substantial amounts of frictional resistance to piston movement.

Another object of the present invention is to provide a dry friction shock absorber wherein the piston is fabricated primarily from an elastomer of substantial size which causes the shock absorber to dampen high frequency vibrations between the parts with which it is associated while still functioning as a shock absorber for high shock loads.

Yet another object of the present invention is to provide a dry friction shock absorber in which the cylinder or casing can comprise precision low cost tubing of plastic, aluminum, steel or stainless steel.

A still further object of the present invention is to provide a dry friction shock absorber which will absorb shocks in both tension and compression yet will permit relative movement between the casing and its piston without shock absorption when subjected to small gradual movements. Other objects and attendant advantages of the present invention will readily be perceived hereafter.

The present invention relates to a shock absorber comprising a casing having an internal surface, a piston, an external surface of low coefficient of friction bearing material on said piston, said external surface being in contiguous relationship with said internal surface, means for moving said piston in first and second opposite directions relative to said casing, and actuating means for applying a biasing force tending to move said external surface outwardly toward said internal surface to increase the friction therebetween to provide a shock absorbing action when a first force is applied to said shock absorber for moving said piston in said first direction and for relieving said biasing force to decrease the friction therebetween when a second force is applied to said shock absorber for moving said piston in said second direction.

The present invention also relates to a shock absorber comprising a casing having an internal surface, a piston, an external surface of low coefficient of friction bearing material on said piston, said external surface being in contiguous relationship with said internal surface, means for moving said piston in first and second opposite directions relative to said casing, and actuating means for applying a biasing force tending to move said external surface outwardly toward said internal surface to increase the friction therebetween to provide a shock absorbing action when said force is applied in said first direction in response to a shock force applied to said shock absorber, and said actuating means including means for failing to apply said biasing force when said force which is applied in said first direction is gradual and is of lesser magnitude than a shock force.

The various aspects of the present invention will be more fully understood when the following portions of the specification are read in conjunction with the accompanying drawings wherein:

DESCRIPTION OF THE PREFERRED EMBODIMENTS

Figures 1, 2:
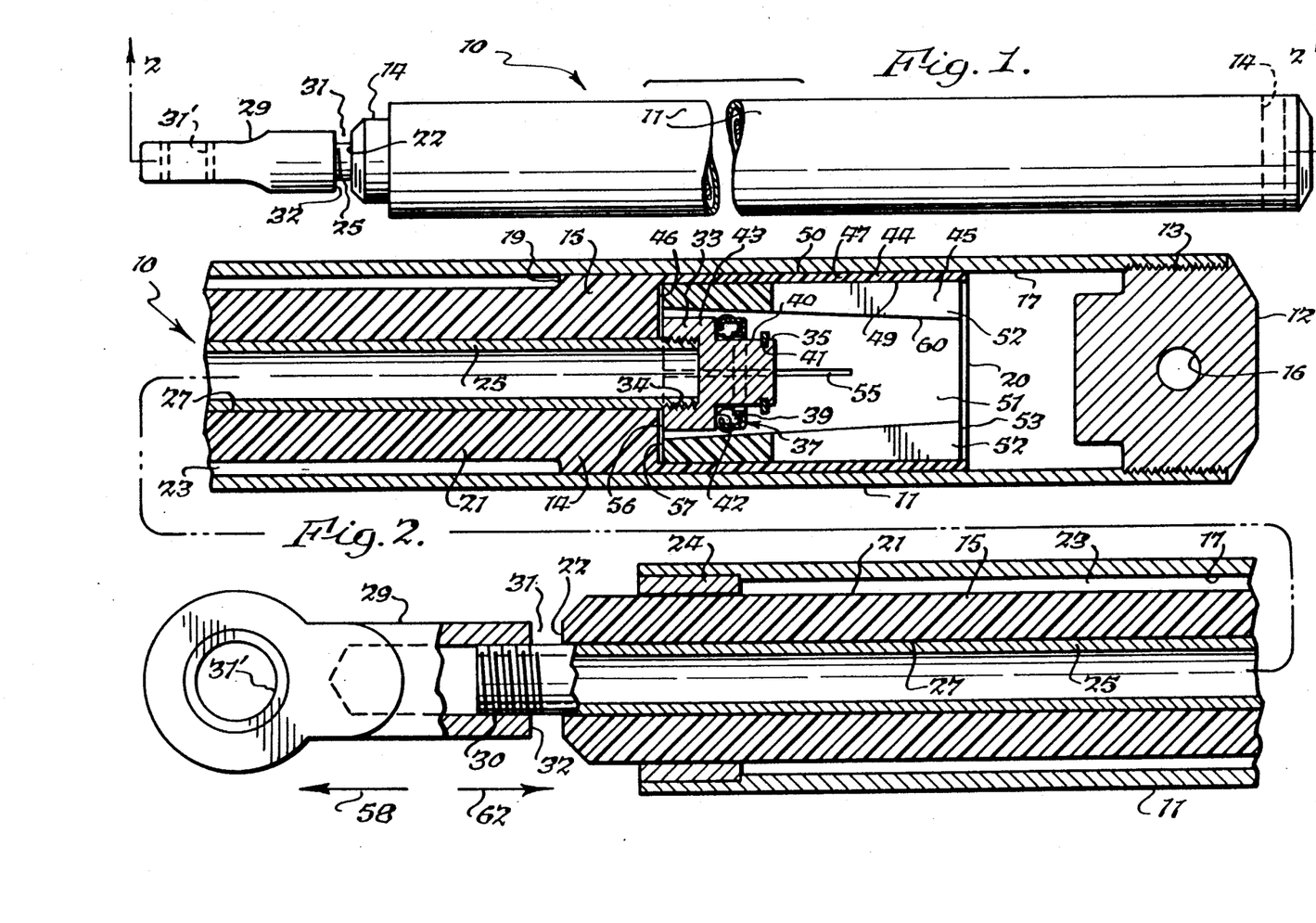
FIG. 1 is a fragmentary side elevational view of the improved adjustable dry friction-type of shock absorber of the present invention.
FIG. 2 is a fragmentary enlarged cross sectional view taken substantially along line 2—2 of FIG. 1.

The improved adjustable dry friction shock absorber 10 of the present invention includes an outer cylindrical casing 11 which may preferably be made of metal, and which can be fabricated from low cost precision hydraulic cylinder tubing of plastic, aluminum, steel or stainless steel. An end plug or attachment member 12 is threaded into casing 11 at 13 and it has a bore 16, which is in alignment with bores in casing 11, for attaching casing 11 to a foreign object. A hollow piston 14 includes an end portion 15 of a diameter which provides a close fit with the inner surface 17 of casing 11. End portion 15 extends from shoulder 19 to end 20 of the piston. A smaller diameter portion 21 of piston 14 extends from shoulder 19 to the outer end 22. An annular clearance 23 exists between the outer surface of portion 21 and the inner surface 17 of casing 11. An annular sleeve 24 of suitable material acts as a bearing for guiding piston portion 21 for rectilinear movement.

An actuating rod 25 is slidably mounted within bore 27 of piston 14. A coupling or attachment member 29 is threaded onto the end of actuating rod 25 at 30, and it has a bore 31' therein for attachment to an external member. The amount that member 29 is threaded onto the end of actuating member 25 determines the clearance 31 between end 22 of piston 14 and shoulder 32 at the end of coupling member 29.

A ball carrying member 33 is threadably mounted onto actuating rod 25 at 34, and its outer end is formed into a reduced diameter portion 35 which mounts ball bearing race 37 which carries balls 39 which rest on cylindrical surface 40 of end 35. A snap ring 41 at one end of reduced end portion 35 prevents race 37 from moving off of the end thereof, and the annular shoulder 42 at the junction of larger diameter portion 43 and reduced end portion 35 defines the limit of movement of balls 39 to the left in FIGS. 2 and 3.

The extreme end portion 44 of piston portion 15 includes a cylindrical bore or chamber 45 which extends from end 20 to surface 46. Thus, end portion 44 forms an annular cylindrical shell 47 having an inner surface 49 and an outer surface 50, which is in substantially contiguous abutting relationship with the inner surface 17 of casing 11.

An expandible sleeve-like member 51 is retained in hollow end 45 of piston 15 with a wedge fit, or a flange, (not shown) may be formed at end 20 to prevent member 15 from moving out of bore 45. Expandible sleeve-like member 51 has diametrically opposed axial slits 52 (FIG. 4) extending inwardly from end 53 to a point to the left of the axial midpoint 54 (FIG. 3) of member 51. A pair of diametrically opposed slots 55 extend inwardly from end 57 of expandible member 51 and they extend to the right beyond axial midpoint 54. Thus, there is a distance A where the inner ends of slots 52 and 55 overlap. Slits 52 and 55 are oriented at 90° to each other.

The inside of expandible member 51 is tapered and thus forms a frustoconical surface as shown at 60. Surface 60 is of diminishing diameter as it extends toward the right in FIG. 2. Thus, when the ball race 37 is moved to the right in FIG. 3 from its position in FIG. 2, the 180° sides 61 on opposite sides of slots 52 will expand outwardly as balls 39 ride along tapered surface 60 toward its smaller diameter portion thereof. This will cause flexible resilient annular portion 44 of piston 14 to be forced outwardly to increase the engaging force between its outer surface 50 and inner surface 17 of casing 11 for a substantial portion of the distance of contact between the outer surface of member 51 and inner surface 49 of shell portion 47. Thus, even though the piston is of a low coefficient of friction bearing material, the relatively large area of contact under pressure will produce sufficient resistance for effective shock absorber action.

Figure 3:
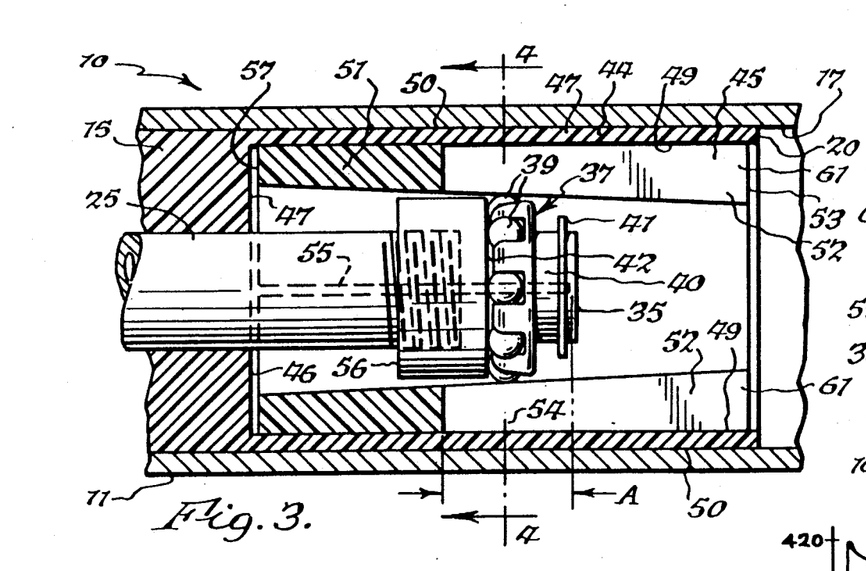
FIG. 3 is a fragmentary enlarged portion of FIG. 2 showing the position of parts of the shock absorber in a shock absorbing position.
Figure 4:
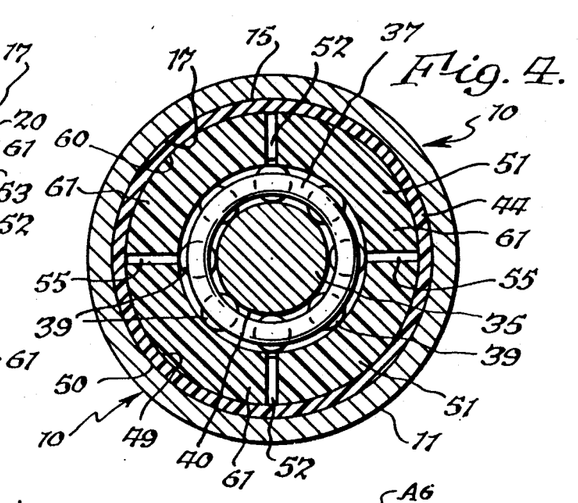
FIG. 4 is a cross sectional view taken substantially along line 4—4 of FIG. 3.

The expansion of expandible member halves 61 and 51 is effected when a force in the direction of arrow 62 is applied to rod 25. Normally there is sufficient friction between the outer surface 50 of piston 15 and inner surface 17 of casing 11 to maintain piston 15 against movement to the right. Thus, when a force 62 is applied to attachment member 29, rod 25 will slide to the right within bore 27 of piston 15. Furthermore, as balls 39 move along the tapered bore surface 60, a continually increasing engaging force is applied between outer surface 50 of piston 15 and inner surface 17 of casing 11.

The limit of movement of ball race 37 to the right in FIGS. 2 and 3 is determined by the size of gap 31 between shoulder 32 of attachment member 29 and end 22 of piston 15. After shoulder 32 engages shoulder 22, piston 14 will be caused to move to the right in its entirety, and the frictional resistance provided by the shock absorber will be determined by the degree to which piston portion 44 has been forced into engagement with inner casing surface 17, which is determined by the amount member 51 has been expanded.

It will readily be appreciated that if fitting 29 is unthreaded so that gap 31 is larger, ball race 37 will move a greater distance to the right before shoulder 32 abuts shoulder 22, and thus there will be a greater frictional force provided by the shock absorber because of the increased expansion of expandible member 45. Conversely, if fitting 29 is threaded more onto rod 25 so that gap 31 is smaller, race 37 will move a lesser distance to the right before shoulder 32 engages shoulder 22, and thus the shock absorber will operate to provide less resistance to the shock. Thus, by virtue of the threaded connection 30 between fitting 29 and actuating member 25, the shock absorber of FIGS. 1–5 is adjustable.

As noted above, the casing 11 is made of metal and is preferably fabricated from steel. Piston 15 is preferably made of a low coefficient of friction bearing material or elastomer such as HYTREL, nylon, DELRIN or polyurethane which are stretchable, flexible and resilient. Other materials can be used which have a low coefficient of friction and yet are basically an elastomer which is stretchable, flexible and resilient. The foregoing materials also have a small wear particle size. In this respect, it has been found that clearances between sliding parts are proportional to the wear particle size, and when such wear particle size of a substance is small, there will be small clearances between it and a surface with which it is in contiguous sliding relationship. Such small clearances permit rapid shock absorber action when the latter depends on the degree of pressure between adjacent relatively movable parts, as in the present instance. The wear particle size is broadly defined as the amount of material which is shed from the surface of a member when it slidably moves along another member with friction therebetween. Furthermore, since the wear particle size is small, there is a small potential for contamination from such shed particles of the environment in which the shock absorber operates.

It is to be especially noted that the use of low coefficient of friction bearing materials in a friction type of shock absorber is contrary to what would be expected where high friction is desirable. The foregoing characteristics of a low coefficient of friction is desirable so that misalignment or side loading does not induce any appreciable friction while this same factor permits very small clearances between the relatively movable parts of the piston and the inside of the cylinder to permit substantially instantaneous application of friction loading forces upon expansion of the annular piston portion 44. Furthermore, because of its resilience, the frictional forces are relieved as soon as the expanding forces discussed above are removed when the actuating rod 25 moves to the left. In this respect, when rod 31 is moved to the left in the direction of arrow 58, initially the relatively high friction between piston portion 44 and internal casing surface 17 will cause piston 14 to remain stationary. As rod 25 moves to the left, snap ring 41 will engage ball race 37 and pull it toward the left in FIG. 3. As soon as this occurs, expandible manner 51, because of its resilience, will return to a relaxed condition, and thereafter annular piston portion 44, because of its resilience, will return to its normal relaxed position wherein it no longer exerts a frictional shock-absorbing force on casing surface 17. When end 56 (FIG. 3) of ball carrying member 33 abuts surface 47 of piston 15, the latter will be moved to the left to position it for a subsequent shock absorbing action.

The piston 14, as shown, is a relatively solid member of the above-described elastomeric material which, in addition to performing its above-described shock absorbing function, also acts as a dampener for high frequency vibration when it is not acting as a shock absorber.

Figure 5:
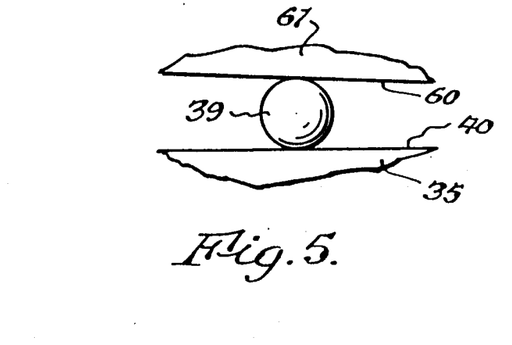
FIG. 5 is a schematic view showing the relationship between the opposite sides of the balls of the preceding figures.
Figure 5A:
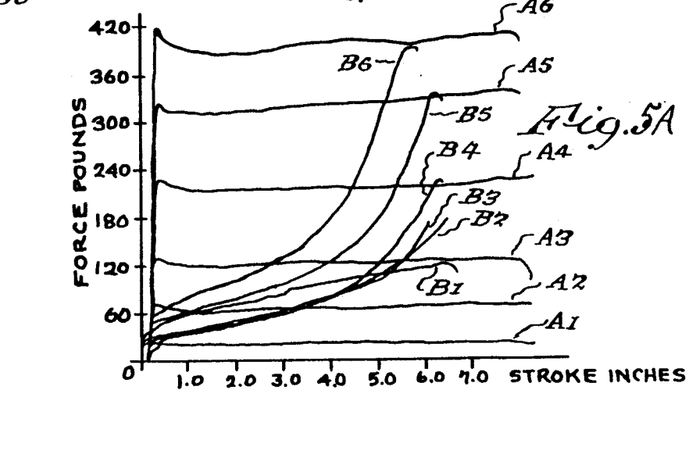
FIG. 5A is a graph depicting the classic flat shock curves of various magnitudes obtainable by adjusting the shock absorber versus the shock curves obtainable from comparable simple hydraulic shock absorbers of various sizes.

In FIG. 5A a graph is shown wherein the shock curves which are obtainable from a shock absorber of the type shown in FIGS. 1–5 are compared with the shock curves which are obtainable by the use of conventional hydraulic shock absorbers. In this respect, shock curves $A_1$, $A_2$, $A_3$, $A_4$, $A_5$ and $A_6$ are shorn at various increasing degrees of adjustment of the shock absorber, with the higher curves being progressively obtainable as fitting or attachment member 29 is unscrewed, as discussed above. Shock curves $A_1$–$A_6$ are flat square wave curves which reach their substantial maximum shock force almost immediately, after shoulders 22 and 32 are engaged. In contrast, conventional hydraulic shock absorbers provide curves, such as $B_1$, $B_2$, $B_3$, $B_4$, $B_5$ and $B_6$ which correspond to the shock curves $A_1$–$A_6$. It can readily be seen that the B series of shock curves do not reach their maximum shock absorbing capacity until after a much greater piston stroke and are thus not capable of providing the substantially instantaneous shock loading of the dry friction shock absorber of FIGS. 1–5.

Figures 6, 7:
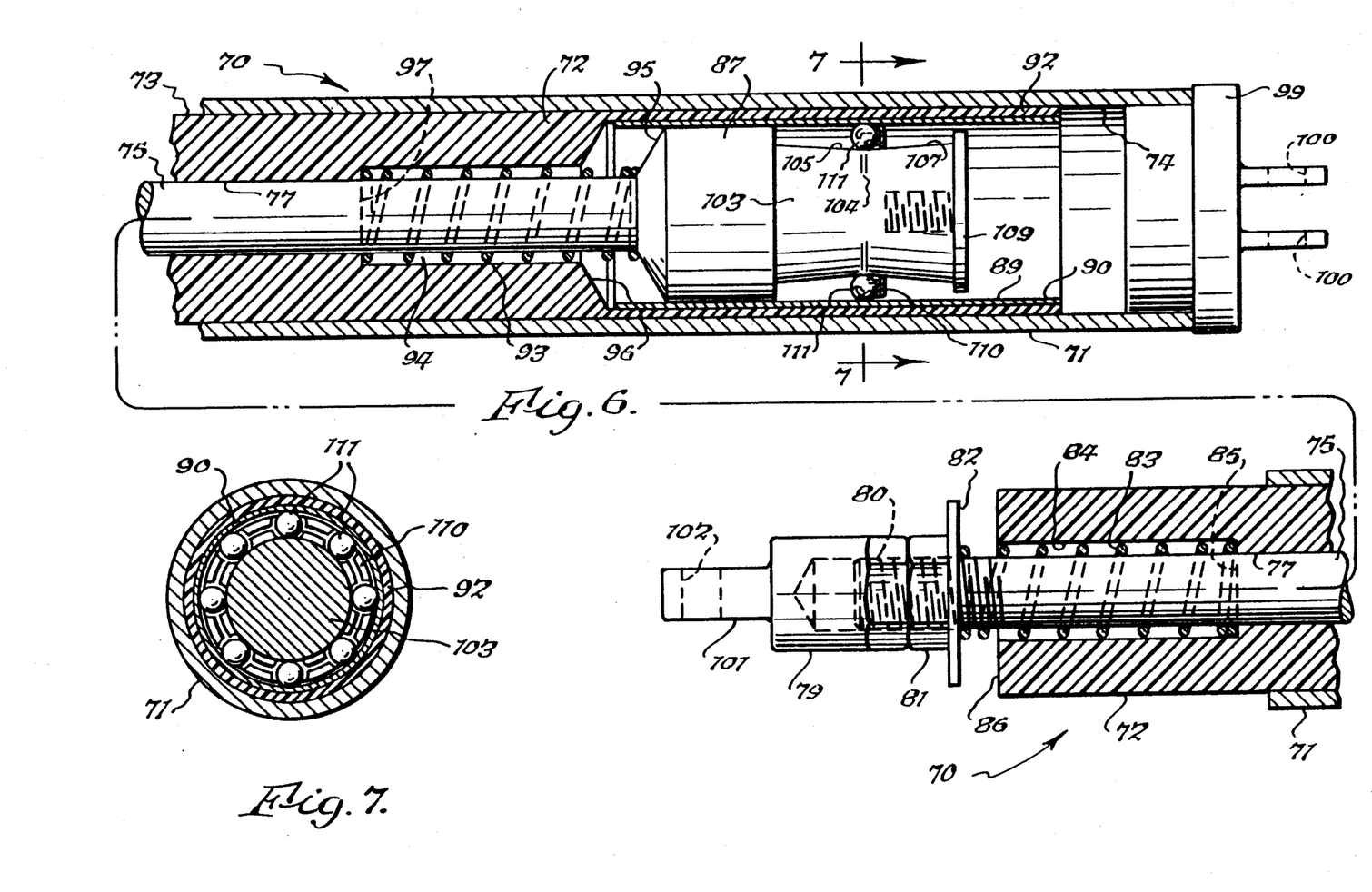
FIG. 6 is a fragmentary cross sectional view of another embodiment of the present invention which is operable in both tension and compression and which is actuatable only in response to shock loading but is not actuatable in response to gradual forces applied thereto.
FIG. 7 is a cross sectional view taken substantially along line 7—7 of FIG. 6.

In FIGS. 6 and 7 a modified dry friction shock absorber 70 is disclosed which is capable of permitting slow piston movement without shock loading but which will provide shock loading upon abrupt movement between the piston and its casing. Shock absorber 70 is operable to provide shock absorbing action when subject to either tension or compression. Shock absorber 70 includes a casing 71 which is preferably made of metal. It also includes a piston 72 which is made of one of the above-described low friction, small wear particle size materials. The outer surface 73 of piston 72 has a close sliding fit with internal surface 74 of casing 71. An actuating rod 75 is slidable within bore 77 of piston 72. An attachment fitting 79 is threaded onto the outer end of rod 75 at 80, and it bears against lock nut 81 which has a washer 82 located in contiguous relationship thereto. A helical spring 83 is located in bore 84 of piston 72, and it has one end bearing against washer 82 and the other end bearing against shoulder 85 at the end of bore 84.

The opposite end of actuating rod 75 is formed into an enlarged head portion 87 which slides relative to internal surface 89 of resilient metal sleeve 90 which lines chamber 91 at the end 92 of piston 72. A helical spring 93 encircles the end of actuating rod 75 within bore 94 of piston 72, and it has one end bearing against surface 95 of actuating rod portion 87 and its other end bearing against shoulder 97 at the end of bore 94. Thus springs 83 and 93 bias actuating rod 75 to a neutral position within piston 72. A bifurcated attachment fitting 99 has bores 100 therein for attaching casing 71 to a foreign object, and fitting 79 has an end 101 with a bore 102 therein for attaching the actuating rod 75 to a foreign object.

Extending to the right of cylindrical portion 87 of actuating rod 75 is an end portion 103 which has a central portion 104 of minimum diameter, and extending outwardly therefrom are two frustoconical portions 105 and 107. Portion 105 has its larger diameter portion formed integrally with cylindrical member 87, and an annular collar 109 is formed at the outer end of portion 107. A ball race 110 is located as shown, and it carries balls 111 loosely therein so that they can move radially outwardly as ball race 110 rides up onto frustoconical portions 105 and 107.

The structure of the embodiment of FIGS. 6 and 7 permits actuating rod 75 and piston 72 to move back and forth within casing 71 without exerting any shock absorber action when the movements therebetween are very slow and gradual, as would be experienced during relatively small movements between the foreign objects to which coupling members 79 and 99 are attached. Such types of movements, for example, are experienced when there are thermal expansions of pipes in power plants of various types, However, in the event of rapid excitation of the shock absorber 70 due to an explosion or an earthquake jarring the member to which it is attached, the full shock absorbing capacity will be almost instantaneously applied by the sock absorber, whether the attachment members 99 and 101 are being pulled apart in tension or are being pushed together in compression. In this respect, for example, if attachment members 99 and 101 are being pushed together, balls 111 will ride up onto the surface of frustoconical portion 105. In doing so, the resilient metal sleeve 90 will be caused to expand for a substantial portion of its length which will cause the annular resilient piston portion 92 to expand for a substantial portion of its length to increase its frictional engagement with the inside surface 74 of casing 71, and thus a shock absorbing capacity of the type depicted in FIG. 5A will immediately be obtained. If attachment members 99 and 101 are pulled apart when a tensile load is applied to the shock absorber 70, the balls 111 will ride up onto the surface of frustoconical surface 107 to provide the shock absorbing capacity by causing sleeve 90 to expand for a substantial portion of its length. Thus, the dry friction shock absorber 70 of FIGS. 6 and 7 is operable both in tension and compression to provide the shock curves of the type shown in FIG. 5A.

In operation, when a tension or compression force is applied to the shock absorber 70, initially piston 72 will remain stationary because of its frictional engagement with casing 71. During this time rod 75 will slide within bore 77 of piston 72, and balls 111 will ride up on one of the frustoconical portions 105 or 107. If the shock absorber is placed in compression, balls 111 will ride up on frustoconical portion 105 until washer 82 engages end 86 of piston 72. Thereafter, piston 72 will move to the right, and its resistance to movement or shock-absorbing capacity will be determined by the position of balls 111 on frustoconical portion 105, that is, the higher up balls 111 are, the higher will be the frictional resistance between piston portion 92 and casing 71. By adjusting the position of washer 82 on rod 75, the shock absorbing capacity can be adjusted. More specifically, the closer it is to shoulder 86, the less the shock-absorbing capacity, and vice versa. If the shock absorber is placed in tension, the amount of shock-absorbing capacity is determined by the distance between surface 95 and surface 96 of piston 72. More specifically, the piston 74 will remain stationary when rod 75 moves to the left, and thus balls 111 will ride up on frustoconical surface 107 until surface 95 engages surface 96, at which time piston 72 will move to the left until the end of the shock-absorbing stroke. The shock absorbing capacity in tension can be adjusted by providing structure for adjusting the spacing between surfaces 95 and 96.

After a compression stroke has terminated and attachment members 99 and 101 are pulled apart, balls 111 will move back down to central portion 104 from portion 105, and surface 95 will engage surface 96 to move piston 72 to the left if spring 93 is compressed sufficiently, or springs 83 and 93 will center piston 72 and thus move it to the left now that balls 111 have returned to the central position 104. The resilience of sleeve 90 and piston portion 92 will cause them to return to a non-extended condition wherein there is minimal friction between piston portion 92 and casing surface 74. After a tension stroke has terminated and attachment members 99 and 101 are pushed together, balls will return to central portion 104 from surface 107, and washer 82 may engage shoulder 86 to move piston 72 to the right if washer 82 has moved sufficiently to permit this, or, if not, after the resilience of sleeve 90 and piston portion 92 have returned to a non-extended condition wherein there is minimal friction between piston portion 92 and casing surface 74, springs 83 and 93 will center piston 72 to return it to a neutral position.

Figures 8, 9:
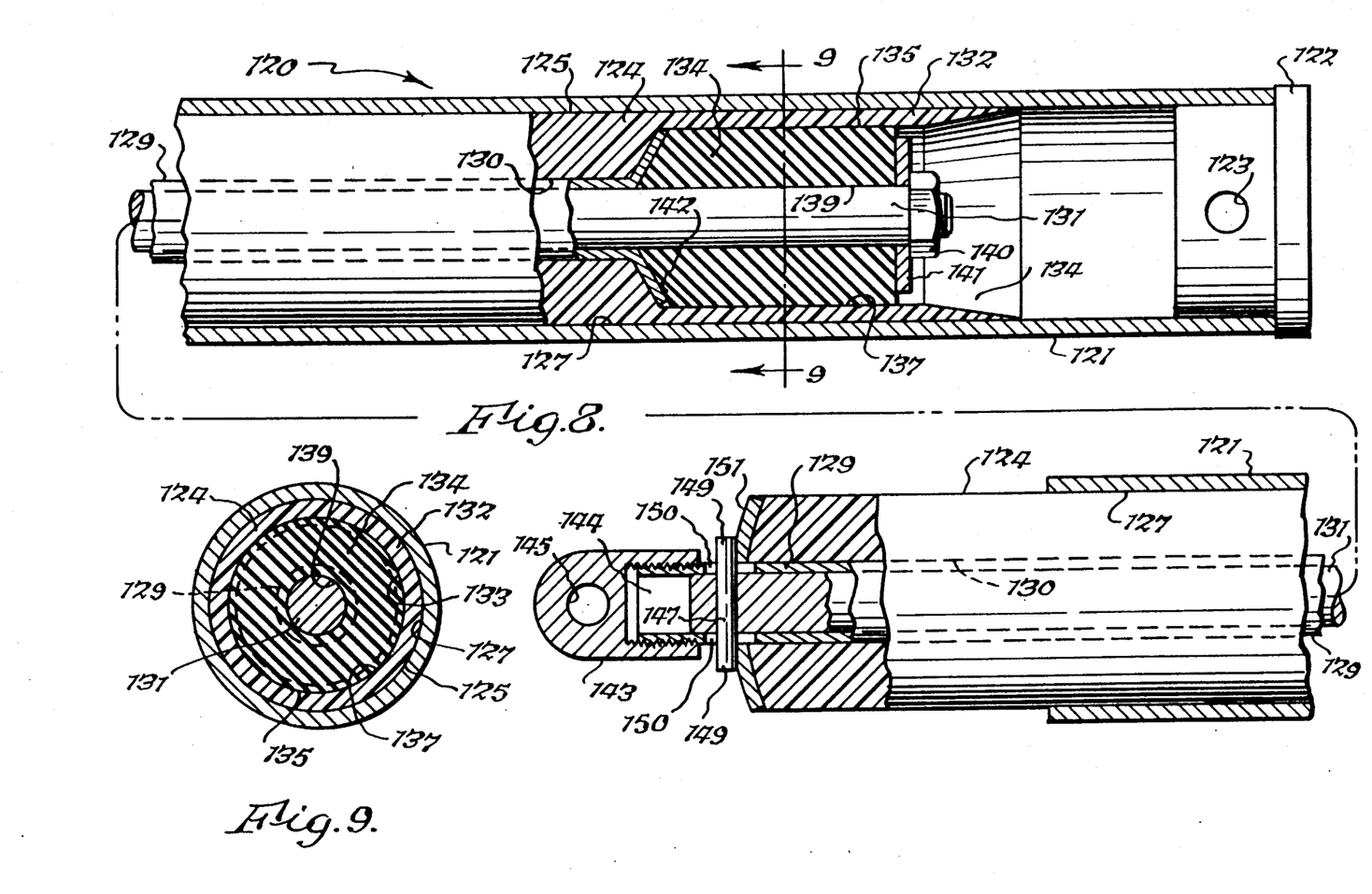
FIG. 8 is a fragmentary cross sectional view of a still further embodiment of the present invention which utilizes a soft elastomeric member as the expanding medium for expanding an elastomeric sleeve.
FIG. 9 is a cross sectional view taken substantially along line 9—9 of FIG. 8.

In FIGS. 8 and 9 a still further embodiment of the present invention is disclosed. In this embodiment a dry friction shock absorber 120 includes a casing 121 having an end plug or attachment fitting 122 suitably secured at the end thereof, and it has a bore 123 therein for attaching the casing to a foreign object. A piston 124 of the suitable bearing material with a small wear particle size as described above has an outer surface 125 in close fitting engagement with inner surface 127 of casing 121. A metal sleeve 129 is positioned within bore 130 of piston 124, and an actuating rod 131 is slidable in sleeve 129. The end 132 of piston 124 has a chamber 133 therein which receives a soft flexible elastomeric annular plug 134 which has its outer surface 135 in engagement with the inner surface 137 of annular piston portion 132. A bore 139 in plug 134 receives the end of actuating rod 131, and plug 134 is secured within chamber 133 by nut 140 which bears on washer 141. The opposite end of plug 134 bears against frustoconical flared portion 142 at the outer end of tube 129.

An attachment fitting 143 is threaded onto the end 144 of tube 129. A bore 145 in fitting 143 is used to attach it to a foreign object. Rod 131 has a pin 147 fixed therein which extends across a diameter of the rod. The outer ends 149 of pin 147 ride in slots 150 of tubular member 129. The ends 149 of pin 147 bear against plate 151 which is secured to the outer end of piston 124.

In operation the shock absorber 120 operates in compression. More specifically, if a compressive force is applied tending to move attachment members 122 and 143 toward each other, sleeve 129 will move relative to rod 131, and thus the frustoconical flared end portion 142 of sleeve 129 will move toward washer 141 to tend to compress the elastomeric member 134 and force it radially outwardly which will deflect annular resilient piston portion 132 radially outwardly. During this action, the frictional engagement between piston 124 and inner wall 127 of casing 121 prevents the piston 124 from moving to the right. The foregoing radially outward deflection of elastomeric plug 134 continues until the portions of sleeve 129 at the left ends of slots 150 engage the ends of pin 149, and thus continued movement of tube 129 to the right will be accompanied by a movement of piston 124 to the right. However, at this time piston portion 132 will have been moved outwardly into much tighter frictional engagement with the inside surface 127 of casing 121, and thus it is this frictional engagement which will provide the shock absorbing force as piston 124 moves to the right.

After the compressive force is relieved and attachment members 143 and 122 move apart, flared portion 142 will return to the position shown in FIG. 8 and elastomeric member 134 will return to its unstressed condition wherein it will no longer exert a radial outward force on piston portion 132 and thus will no longer exert a frictional shock absorbing resistance on casing 121.

In FIGS. 10-14 a still further embodiment of the present invention is disclosed. In this embodiment the metal sleeve 90 of FIGS. 6 and 7 has been eliminated. The reason for using a metal sleeve in the embodiment of FIGS. 6 and 7 is because of point contact between the balls 111 and the surfaces on which they bear could create undesirable indentations if the balls 111 pressed directly against the plastic of the piston. It is for this reason that the metal sleeve is used so that it is caused to expand the adjacent portions of the plastic piston without creating indentations therein. In the embodiment of FIGS. 10-14 there are substantially cylindrical rollers 160 which are used instead of balls such as 111.

In the embodiment of FIGS. 10-14 the shock absorber 161 includes a metal casing 162. An elastomeric piston 163 of the same type described above relative to the preceding figures has an outer surface 164 which is in slidable engagement with the inner surface 165 of casing 162. An attachment member or clevis 167 is fixedly attached to casing 162. A rod 169 is slidably received within a bore 170 in piston 163. A spring 171, which is located in bore 172 of piston 163, encircles rod 169, and it has one end bearing against shoulder 173 at the end of bore 172, and it has its opposite end bearing against washer 174 which is retained on rod 169 by nut 175 threadably mounted on the end of rod 169.

Figures 10, 11, 12, 13:
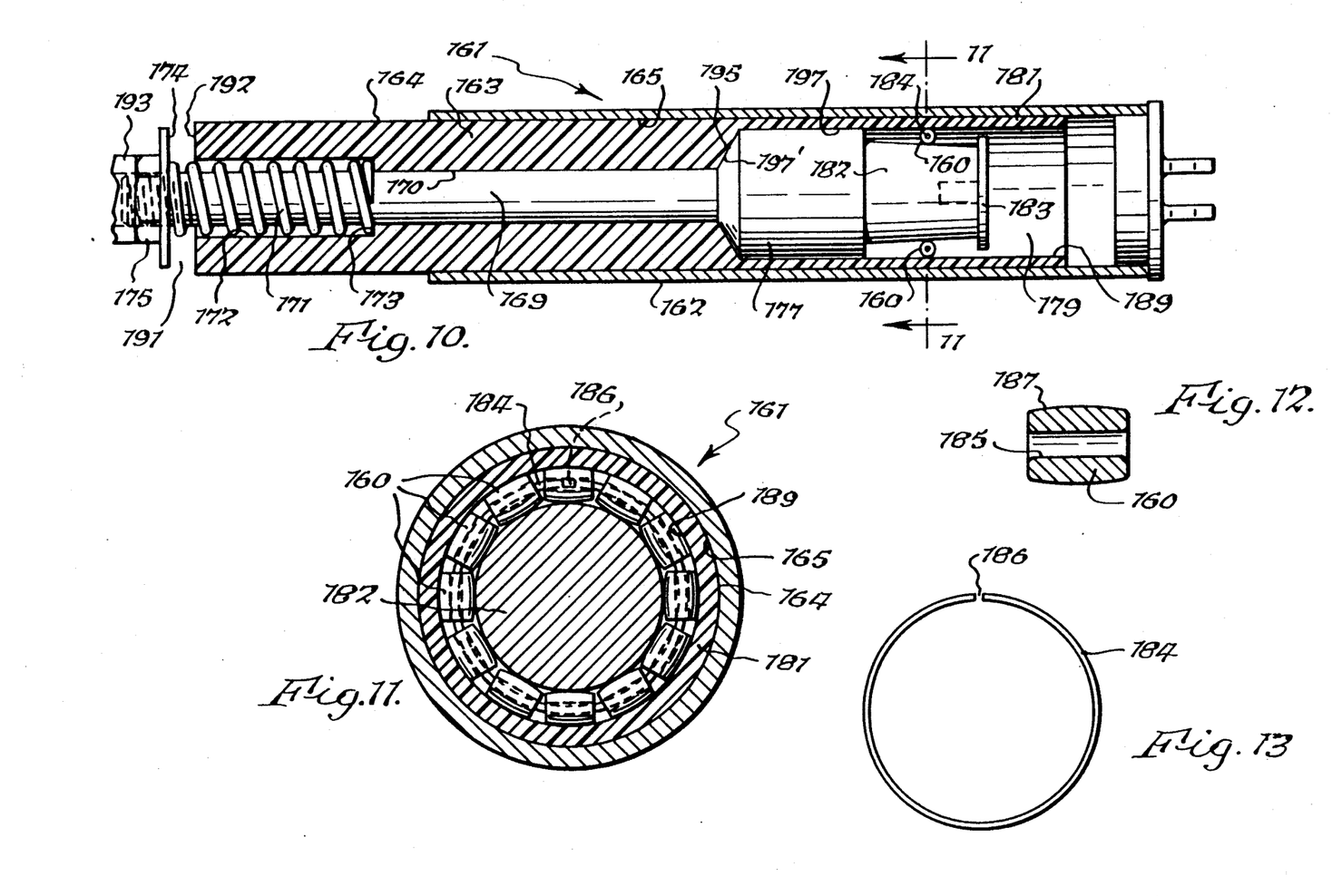
FIG. 10 is a fragmentary cross sectional view of a still further embodiment of the present invention utilizing modified roller-type expanding members.
FIG. 11 is a cross sectional view taken substantially along line 11—11 of FIG. 10.
FIG. 12 is a cross sectional view of the type of roller which is used in the embodiment of FIG. 10.
FIG. 13 is a end elevational view of the ring on which the rollers of FIG. 13 are mounted.

A cylindrical member 177 is integrally connected to the right end of rod 169, and it is housed within chamber 179 of piston 163. Chamber 179 is defined by an annular portion 181 of the piston 163. A frustoconical portion 182 is formed integrally at the end of rod portion 177, and an annular collar 183 is located at the end of frustoconical portion 182. A plurality of substantially cylindrical rollers 160 are strung onto resilient yieldable wire core 184 which extends through bores 185 in the rollers 160. A split 186 permits core 184 to expand. The rollers 160 occupy the postions shown in FIG. 11 wherein their outer curved barrel-like surfaces 187 tend to match the internal circumference of the annular end portion 181 of piston 163. Therefore, since there is substantially line contact between each of the rollers and the internal surface 189 of piston portion 181, there will be little tendency for the rollers to indent the plastic when they are forced outwardly to expand it into greater frictional engagement with the inside surface 165 of casing 162. The amount that frustoconical portion 182 will move axially relative to rollers 160 before piston 163 is caused to move to the right is determined by the gap 191 between washer 174 and shoulder 192 of piston 163. This gap can be adjusted by the threading of nut 175 relative to rod 169. An attachment member, such as 29 of FIG. 1, is fragmentarily shown at 193.

The embodiment of FIG. 10 operates in compression. In this respect, when attachment members 167 and 193 are moved toward each other, the frictional engagement between piston 163 and casing 162 will hold it against movement as rod 169 moves to the right. At this time rollers 160 will ride up onto frusto-conical portion 182 to expand annular piston portion 181 outwardly into tighter frictional engagement with the casing. The piston 163 will remain stationary until washer 174 engages shoulder 192, at which time piston 163 will be forced to the right to provide a shock-absorbing stroke. By adjusting the position of nut 175 on rod 169 to adjust gap 191, the frictional force between the piston and the casing can be adjusted before the piston is forced to move. During the movement to the right of rod 169 without accompanying movement of piston 163, surface 195 of rod portion 177 will move away from piston surface 197. When attachment members 167 and 193 are moved apart after the termination of a compression stroke, rollers 160 will move down member 182 so that they do not exert a radially outward force on piston portion 181, and thus the shock-absorbing friction on casing 162 is relieved. At this time, surface 195 of rod portion 177, which moved away from surface 197' of piston 163 during the shock-absorbing stroke, will engage surface 197 to pull piston 163 to the left to an initial position from which it can again provide a shock-absorbing action. Spring 171 will maintain rod 169 and piston 163 in the relative positions shown in FIG. 10 when the shock absorber is in a relaxed condition. If desired, the roller construction of FIGS. 10-14 may be substituted for the ball construction of FIGS. 6 and 7, and thus the sleeve 90 of the latter figures can be eliminated if desired.

It can thus be seen that the improved dry friction shock absorber of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A shock absorber comprising a casing having an internal surface, a piston, an external surface of low coefficient of friction bearing material on said piston, said external surface being in contiguous relationship with said internal surface, means for moving said piston in first and second opposite directions relative to said casing, actuating means for applying a biasing force tending to move said external surface outwardly toward said internal surface to increase the friction therebetween to provide a shock absorbing action when a first force is applied to said shock absorber for moving said piston in said first direction and for relieving said biasing force to decrease the friction therebetween when a second force is applied to said shock absorber for moving said piston in said same direction, adjustment means for adjusting said biasing force, said piston comprising an elongated member having first and second piston end portions, a hollow portion at said first piston end portion, a bore in said elongated member extending between said hollow portion and said second piston end portion, a rod slidably mounted in said bore, first and second rod end portions on said rod, said first rod end portion extending into said hollow portion, said second rod end portion extending outwardly beyond said second piston end portion, said actuating means being mounted on said first rod end portion within said hollow portion, said actuating means including varying means for varying said biasing force depending on the amount of travel of said first rod end portion into said hollow portion, a fitting adjustably mounted on said second rod end portion, a fitting end on said fitting spaced from said second piston end portion to define a clearance therebetween and for engaging said second piston end portion upon movement of said rod in said first direction for producing said biasing force and said adjustment means for adjusting said biasing force comprising means for adjusting the distance between said fitting end and said second piston end portion to thereby control the limit of travel of said varying means into said hollow portion as determined by the ultimate engagement between said fitting end and said second piston end portion.

2. A shock absorber comprising a casing having an internal surface, a piston, an external surface of low coefficient of friction bearing material on said piston, said external surface being in contiguous relationship with said internal surface, means for moving said piston in first and second opposite directions relative to said casing, actuating means for applying a biasing force for moving said external surface outwardly toward said internal surface to produce friction therebetween during movement of said piston in at least one of said first and second opposite directions to thereby produce a shock absorbing action, and adjustment means for causing said actuating means to produce selectively variable predetermined maximum amounts of frictional engagement between said internal and external surfaces when said actuating means apply said biasing force for moving said external surface outwardly during movement of said piston in one of said first and second directions.

3. A shock absorber as set forth in claim 2 wherein said piston is fabricated from flexible resilient material, a hollow portion in said piston, and wherein said actuating means are located in said hollow portion.

4. A shock absorber as set forth in claim 3 wherein said hollow portion is defined by a shell-like annular portion having inner and outer sides and having said external surface on said outer side of said hollow portion and having an inner shell surface on said inner side of said hollow portion.

5. A shock absorber as set forth in claim 4 wherein said actuating means comprises an actuating member which moves outwardly to bias said shell-like annular portion toward said casing when said force is applied in said first direction and which moves inwardly to permit said resilience of said piston material to bias said shell-like annular portion away from said casing when said force is applied in said second opposite direction.

6. A shock absorber as set forth in claim 5 wherein said actuating member comprises a sleeve-like member having an outer sleeve surface in contiguous relationship to said inner shell surface of said shell-like annular portion, means on said sleeve-like member for permitting it to expand, an inner sleeve surface on said sleeve-like member, said inner sleeve surface being of diminishing diameter in said first direction, and a contact member within said sleeve-like member for pressing against said inner sleeve surface to cause said sleeve-like member to tend to expand for a substantial portion of its length to thereby cause said shell-like annular portion to tend to expand substantially throughout the portion of its axial length in contact with said substantial portion of said sleeve-like member to thereby provide increased pressure between said external surface of said shell-like annular portion and said inner surface of said casing for said substantial portion of said axial length of said sleeve-like member.

7. A shock absorber as set forth in claim 2 wherein said adjustment means are located externally of said casing.

8. A shock absorber comprising a casing having an internal surface, a piston, an external surface of low coefficient of friction bearing material on said piston, said external surface being in contiguous relationship with said internal surface, means for moving said piston in first and second opposite directions relative to said casing, actuating means for applying a biasing force tending to move said external surface outwardly toward said internal surface to increase the friction therebetween to provide a shock absorbing action when a first force is applied to said shock absorber for moving said piston in said first direction and for relieving said biasing force to decrease the friction therebetween when a second force is applied to said shock absorber for moving said piston in said second direction, said piston comprising an elongated member having first and second piston end portions, a hollow portion at said first piston end portion, a bore in said elongated member extending between said hollow portion and said second piston end portion, a rod slidably mounted in said bore, first and second rod end portions on said rod, said first rod end portion extending into said hollow portion, said second rod end portion extending outwardly beyond said second piston end portion, said actuating means being mounted on said first rod end portion within said hollow portion, said actuating means including engaging means mounted on said second rod end portion and normally spaced from said second piston end portion to define a clearance therebetween when said piston is not being moved in said first direction and for engaging said second piston end portion upon movement of said rod in said first direction for providing said shock absorbing action, said clearance between said engaging means and said second piston end portion thereby controlling the limit of travel of said actuating means into said hollow portion during movement of said piston in said first direction as determined by the ultimate engagement between said engaging means and said second piston end portion to thereby control the amount of frictional engagement between said internal and external surfaces, and means for varying said clearance to produce different magnitudes of shock absorbing action.

9. A shock absorber as set forth in claim 8 wherein said actuating means also includes means for failing to apply said biasing force when said force which is applied in said first direction is gradual and is of lesser magnitude than a shock force.

10. A shock absorber as set forth in claim 9 wherein said actuating means includes second means for also applying said biasing force when said second force is a shock force in said second direction, and wherein said means for failing to apply said biasing force is also operative when said force which is applied in said second direction is gradual and is of lesser magnitude than a shock force.

11. A shock absorber as set forth in claim 10 wherein said actuating means comprises first and second coaxial frustoconical sections connected at their smaller bases and extending coaxially with said piston and located within said hollow portion, an internal surface on said hollow portion, and a ring of rolling members normally located in contiguous relationship to said smaller bases and movable onto said first and second frustoconical sections in response to the application of said first and second forces, respectively, but which remain in contiguous relationship to said smaller bases when said forces are applied to said shock absorber which are of lesser magnitude than a shock force.

12. A shock absorber as set forth in claim 11 wherein said rolling members are mounted on said ring for radial outward movement as they travel onto said frustoconical sections from said position in contiguous relationship to said smaller bases.

13. A shock absorber as set forth in claim 12 wherein said hollow portion is flexible and resilient, an annular member in said hollow portion, an external surface on said annular member, said annular member comprising a deformable elastomeric material, and means on said piston for deforming said elastomeric material to thereby produce said biasing force tending to move said external surface of said annular member radially outwardly to exert a biasing force on said internal surface of said hollow portion.

14. A shock absorber as set forth in claim 11 including spring means between said rod and said piston for positioning said rod relative to said piston.

15. A shock absorber as set forth in claim 14 wherein said spring means comprise a first spring effectively positioned between said actuating means and said piston proximate said hollow portion, and a second spring effectively positioned between said end of said piston and said second end of said rod, said first and second spring effectively centering said rod relative to said piston.

16. A shock absorber comprising a casing having an internal surface, a piston, an external surface of low coefficient of friction bearing material on said piston, said external surface being in contiguous relationship with said internal surface, means for moving said piston in first and second opposite directions relative to said casing, actuating means for applying a biasing force tending to move said external surface outwardly toward said internal surface to increase the friction therebetween to provide a shock absorbing action when a first force is applied to said shock absorber for moving said piston in said first direction for relieving said biasing force to decrease the friction therebetween when a second force is applied to said shock absorber for moving said piston in said second direction, and adjustment means for adjusting the maximum value of said biasing force which is experienced when said actuating means apply said first force to move said external surface outwardly.

17. A shock absorber as set forth in claim 16 wherein said piston is fabricated from flexible resilient material, a hollow portion in said piston, said hollow portion being defined by a shell-like annular portion of said flexible resilient material, said actuating means being located in said hollow portion, and the magnitude of said biasing force being determined by the positioning of said actuating means in said hollow portion of said piston by said adjustment means.

18. A shock absorber as set forth in claim 17 wherein said adjustment means is axially movable into said hollow portion to vary said biasing force, and wherein said adjustment means includes means for determining the amount of axial movement into said hollow portion to thereby determine the adjusted magnitude of said biasing force and therefore the magnitude of said shock absorbing action.

19. A shock absorber as set forth in claim 18 wherein said adjustment means comprises means within said shell-like annular portion having a tapered surface, and means for traveling axially in a substantially rectilinear path relative to said tapered surface to thereby bias said shell-like annular portion radially outwardly.

20. A shock absorber as set forth in claim 19 wherein said means for traveling axially comprises a ring of balls.

21. A shock absorber as set forth in claim 17 wherein said actuating means comprise a frustoconical member coaxial with said piston, a ring of rollers located between said frustoconical member and said internal surface of said hollow portion, and means for effecting relative movement between said frustoconical members and said ring of rollers to thereby apply said biasing force tending to move said external surface outwardly.

22. A shock absorber as set forth in claim 21 wherein said ring of rollers comprise an expandible circular wire-like core, and a plurality of hollow substantially cylindrical rollers mounted on said core.

23. A shock absorber as set forth in claim 16 wherein said adjustment means are located externally of said casing.

* * * * *

UNITED STATES PATENT AND TRADEMARK OFFICE
CERTIFICATE OF CORRECTION

PATENT NO. : 5,133,435
DATED : July 28, 1992
INVENTOR(S) : Paul H. Taylor It is certified that error appears in the above-identified patent and that said Letters Patent is hereby corrected as shown below:

```
Column 5, line 23, change "manner" to --member--.
Column 5, line 43, change "shorn" to --shown--.
Column 6, line 49, change "sock" to --shock--.
Column 12, line 55 (claim 15), change "spring" to --springs--.
Column 12, line 68 (claim 16), after "direction" insert --and--.
```

Signed and Sealed this

Thirty-first Day of August, 1993

Attest:

BRUCE LEHMAN

*Attesting Officer*  *Commissioner of Patents and Trademarks*